United States Patent [19]

Kainulainen

[11] Patent Number: 5,696,799
[45] Date of Patent: Dec. 9, 1997

[54] NETWORK ARRANGEMENT HAVING SEPARATELY SELECTABLE SIGNATURE FOR EACH SIGNAL ENTERING SYSTEM FROM EXTERNAL SYNCHRONIZATION SOURCE

[75] Inventor: Jukka Kainulainen, Helsinki, Finland

[73] Assignee: Nokia Telecommunications Oy, Espoo, Finland

[21] Appl. No.: 448,354

[22] PCT Filed: Nov. 8, 1993

[86] PCT No.: PCT/FI93/00445

§ 371 Date: May 2, 1995

§ 102(e) Date: May 2, 1995

[87] PCT Pub. No.: WO94/11962

PCT Pub. Date: May 26, 1994

[30] Foreign Application Priority Data

Nov. 9, 1992 [FI] Finland .................................. 925070

[51] Int. Cl.$^6$ ...................................... H04J 3/06
[52] U.S. Cl. .......................................... 375/356
[58] Field of Search ........................ 395/354, 356, 395/357; 370/100.1, 103, 105

[56] References Cited

U.S. PATENT DOCUMENTS

| | | | |
|---|---|---|---|
| 2,986,723 | 5/1961 | Darwin et al. | 340/825.26 |
| 4,142,069 | 2/1979 | Stover | 370/507 |
| 4,837,850 | 6/1989 | Maisel et al. | 455/58.1 |
| 4,939,752 | 7/1990 | Literati et al. | 375/356 |
| 5,068,877 | 11/1991 | Near et al. | 375/356 |
| 5,475,717 | 12/1995 | Cordonnier et al. | 375/356 |

FOREIGN PATENT DOCUMENTS

| | | | |
|---|---|---|---|
| 242117 | 10/1987 | European Pat. Off. | H04J 3/06 |
| 490315 | 6/1992 | European Pat. Off. | H04J 3/06 |

OTHER PUBLICATIONS

Rogers: "Clock Source Selection Method in Distributed Communication System Networks", IBM Technical Disclosure Bulletin, vol. 25, No. 118, Apr. 1983, pp. 6293–6298.

*Primary Examiner*—Stephen Chin
*Assistant Examiner*—Kevin Kim
*Attorney, Agent, or Firm*—Cushman Darby & Cushman Intellectual Property Group of Pillsbury Madison & Sutro LLP

[57] ABSTRACT

A network arrangement including a system employing message-based synchronization and having a plurality of nodes interchanging signals containing synchronization messages with information about the priority of the respective signal in the internal synchronization hierarchy of the system. In order that the system can, even as far as synchronization is concerned, be connected to an external device or network to which the message-based synchronization employed in the system is unknown, a signal entering the system from an external synchronization source is assigned a selectable standard signature indicating the priority of the signal from the external synchronization source with respect to the internal signals of the system, the priority indicated by the signature being selectable separately for each signal entering the system.

10 Claims, 4 Drawing Sheets

1

NETWORK ARRANGEMENT HAVING SEPARATELY SELECTABLE SIGNATURE FOR EACH SIGNAL ENTERING SYSTEM FROM EXTERNAL SYNCHRONIZATION SOURCE

BACKGROUND OF THE INVENTION

The invention relates to a network arrangement comprising a system employing message-based synchronization and comprising a plurality of nodes inter-changing signals containing synchronization messages with information about the priority of the respective signal in the internal synchronization hierarchy of the system.

As used in the text below, the term node refers to a junction point between transmission lines in a system. A node may be any device or equipment capable of affecting clock synchronization, such as a branching or cross-connection means.

Nodes in a system utilizing message-based synchronization are interconnected by transmission lines which the nodes use for data transmission. These lines also forward the clock frequency of the transmitting party to the receiving party. Each node selects the frequency of a signal from a neighbouring node or the frequency of its own internal clock source as the source of its own clock frequency. In order that all nodes in the system would operate at the same clock frequency, one usually attempts to make the system to synchronize itself with a single clock source called a master source. All system nodes connected directly to the selected master source are thus synchronized with the master source while nodes connected to the nodes adjacent to the master source but not directly connected to the master source are synchronized with these adjacent nodes. Accordingly, each node at a greater distance from the master source synchronizes itself with a node one node spacing closer to the master source.

In order that the above-described synchronization hierarchy could be established within the system, the system nodes interchange synchronization messages. These messages contain information by means of which individual nodes are able to select a timing source. The system nodes are prioritised and the system tends to synchronize itself with the clock frequency of a node having the highest level of priority. Normally each priority level is assigned to a single system node. Synchronization messages normally contain information about the origin of the clock frequency of the node transmitting the message and the priority of the node as well as a value describing the quality of the clock signal. Accordingly, a neighbouring node clock frequency which originates from a desired node and which is of the highest quality can be selected by an individual node as the source of its own clock frequency. At the system start-up each node selects its own internal clock source as the source of its clock frequency as it has not yet processed any incoming synchronization messages. After the node has processed the first incoming synchronization messages, it selects the clock frequency of a neighbouring node having the highest level of priority as the source of its clock frequency. After all messages have been distributed over the system and the system has achieved a stable state as far as synchronization is concerned, the system has been synchronized hierarchically with the clock frequency of the master source.

FIG. 1 shows a system utilizing message-based synchronization in a stable situation. Priorities assigned to the nodes are indicated by numbers within the circles representing the nodes. The smaller the number, the higher the priority of the node. Synchronization messages transmitted by a node n (n=1 ... 6) are indicated by the reference MSGn. Synchronization messages transmitted by different nodes usually differ from each other and depend on the applied message-based synchronization method. The distribution of the clock frequency from the master clock (node 1) to the other system nodes is illustrated by solid lines. Internodal connections drawn by broken lines are not used in a normal situation for system synchronization, but they are available in change situations.

Message-based synchronization is based on a simple principle that the user defines the synchronization hierarchy of the nodes by assigning each node a dedicated signature indicating the hierarchical level of the node and that the system synchronizes itself with the defined master clock independently by utilizing, if required, all existing internodal connections. If the connection to the master clock fails, and no alternative connection exists, or if the master clock fails, the system synchronizes itself with a node of the next highest level of hierarchy. Response to a change in synchronization takes place by message interchange between nodes.

Message-based synchronization methods of the type described above are described e.g. in U.S. Pat. Nos. 2,986,723 and 4,837,850, which are referred to for a more detailed description. Messages used in one prior art message-based synchronization method (SOMS) will be described more closely below with reference to FIGS. 2 and 3.

A system employing message-based synchronization forms a kind of closed system, at least as far as synchronization is concerned (often also with respect to data transmission). This is problematic as there nevertheless exists a need to interconnect different types of networks.

In the above-mentioned U.S. Pat. No. 4,837,850, the exchange of a network employing message-based synchronization is connected to a higher-order exchange, whereas the network employs fixed assignments so that all exchanges having a connection to this kind of exchange have the highest priority classification within the network. This arrangement does not allow e.g. flexible connection of a plurality of external synchronization sources to the system.

SUMMARY OF THE INVENTION

The object of the present invention is to provide a network arrangement by means of which a system employing a message-based synchronization method can be connected flexibly even with respect to synchronization to one or more external devices or networks which do not understand the message-based synchronization method employed in the system. This is achieved by an arrangement according to the invention which is characterized in that at least one external synchronization source to which the message-based synchronization employed in the is unknown is connected to the system by assigning a signal entering the system from an external synchronization source a selectable standard signature indicating the priority of the signal from the external synchronization source with respect to the internal signals of the system, the priority indicated by the signature being selectable separately for each signal entering the system.

The idea of the invention is to assign a certain standard signature to the signal of an external network or device whenever the signal is of adequate quality for use in synchronization. The signature to be assigned can be determined by the user, and so it is easy for the user to place an external signal on a desired level in the synchronization hierarchy.

According to a preferred embodiment of the invention the format of the assigned standard signature corresponds to the format of the internal synchronization signature of the system, so that the system node is able to process the external signal in its selection process similarly as other signals without any need to modify the internal selection process of the system.

When the arrangement according to the invention is used, the system does not necessarily need any high-level clock as the synchronization can be derived from an external network.

BRIEF DESCRIPTION OF THE DRAWINGS

In the following the invention will be described in more detail with reference to the examples shown in FIGS. 2 to 6 of the attached drawings, in which.

DETAILED DESCRIPTION

Figure 1:
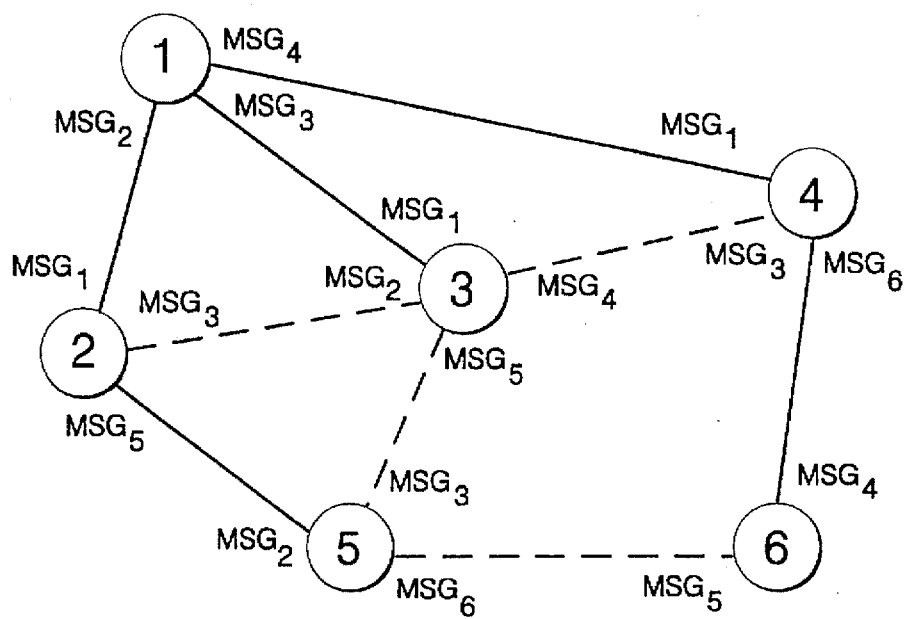
FIG. 1 illustrates a system employing message-based synchronization when the system is in synchronization with the clock frequency of the master source.
Figure 2:
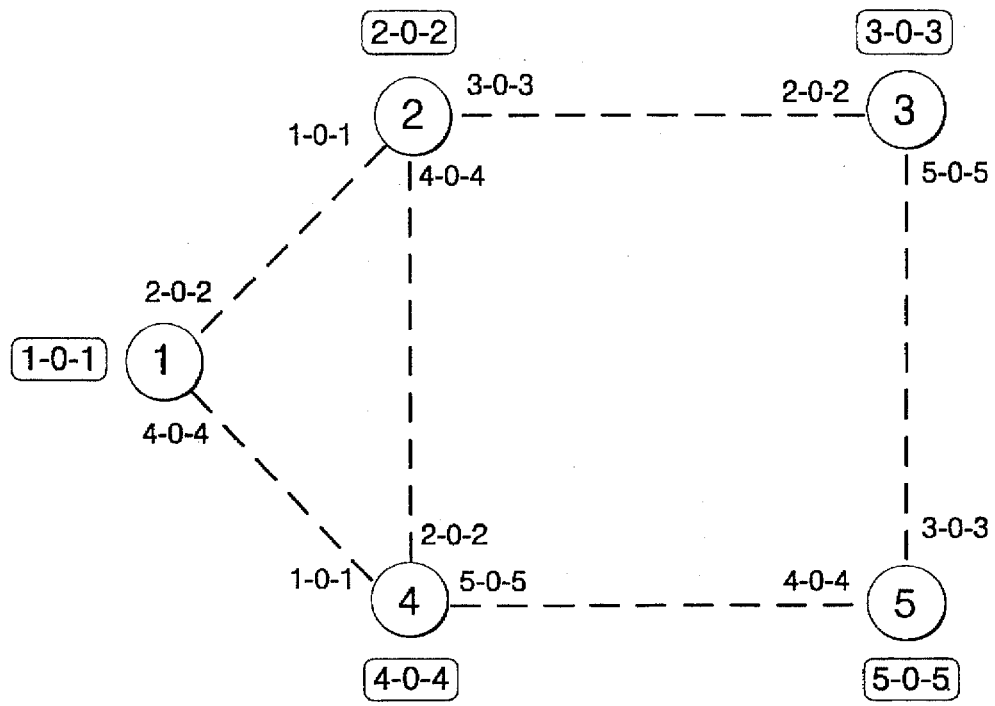
FIG. 2 illustrates a network employing self-organizing master-slave synchronization (SOMS) in its initial state.

FIG. 2 illustrates a system employing self-organizing master-slave synchronization (SOMS), which is a message-based synchronizing method known per se. In this specific case, the system comprises five nodes (or devices) assigned SOMS addresses indicated by the reference numerals 1 . . . 5 according to their level of hierarchy. (The master node of the system has the smallest SOMS address.) The nodes interchange messages containing such SOMS addresses. In this way, the nodes are able to identify each other by means of the address numbers and establish a synchronization hierarchy so that the whole network can synchronize itself with the master node.

As mentioned above, messages transmitted continually in the network are dependent on the applied message-based synchronization method. In addition, the messages are specific for each transmitting node. In the SOMS network, a synchronization message contains three different parts: a frame structure, signature and check sum. The SOMS signature is the most important part of the SOMS message. It comprises three consecutive numbers D1 to D3:

D1 is the origin of the synchronization frequency of a node transmitting a SOMS message, i.e. the SOMS address of a node appearing as a master node to the transmitting node.

D2 is a distance to a node indicated by D1. The distance is given as the number of intermediate nodes.

D3 is the SOMS address of a transmitting node.

Each node (or device) compares continuously incoming SOMS signatures with each other and selects the smallest amongst them. In the signature the different parts D1, D2 and D3 are combined into a single number by placing them in succession (D1D2D3) (for the sake of clarity, a dash will be inserted between the different parts in the text below as follows: D1-D2-D3). Accordingly, a primary criterion for the selection of the smallest address is the SOMS address (D1) of a node appearing as the master node to the preceding nodes, i.e. the node tends to be synchronized with a signal having a frequency originally derived from a node with the smallest possible address. In a stable situation, the whole network is thus synchronized with the same master node (as the master node of the whole network has the smallest SOMS address).

If two or more of the incoming signals are synchronized with the same master node, the one arriving over the shortest path (D2) is selected. The last criterion for selection is the SOMS address (D3) of the node transmitting the SOMS message, which is used for the selection if the incoming signals cannot be distinguished from each other in any other way.

After the node has accepted one of the neighbouring nodes as its new synchronization source on the basis of an incoming SOMS signature, it has to regenerate its own SOMS signature. The new SOMS signature can be derived from the selected smallest SOMS signature as follows: the first part (D1) is left intact; the second part (D2) is incremented by one, and the third part (D3) is replaced with the node's own SOMS address.

Each node also has its own internal SOMS signature X-O-X, where X is the SOMS address of the node. If none of the incoming SOMS messages contains a signature smaller than the internal signature, the node uses its own internal oscillator or possibly a separate synchronization input as the source of clock frequency. Of course, the outgoing SOMS message thereby employs the internal SOMS signature.

The nodes transmit continuously SOMS messages in all directions in order that any changed data in the SOMS signatures would be distributed as rapidly as possible and that they would know the current operating condition of neighbouring nodes. The SOMS signatures cannot be compared with each other until the incoming SOMS messages have been accepted and the SOMS signatures have been extracted from the messages.

When the first SOMS message is received from a specific transmission line, the SOMS signature contained therein is accepted immediately for comparison if the message is faultless. When the incoming transmission line has an accepted SOMS signature and faultless messages containing the same signature are received continuously, the situation remains unchanged. If the SOMS message is found to be faulty, the current SOMS signature is retained until three successive faulty SOMS messages have been received. At this stage the old SOMS signature is no longer accepted for comparison. Waiting for three successive SOMS messages aims at eliminating temporary disturbances.

If no SOMS message is received from the line and there is no line failure, the current SOMS signature is rejected only after a period of time corresponding to three successive SOMS messages. If the line fails totally, the SOMS signature is rejected immediately. If no appropriate SOMS signature is available for comparison due to disturbances in the incoming signal, the SOMS signature of the transmission line is rejected. A constant-value signature where all parts (D1, D2, D3) have their maximum value (MAX-MAX-MAX) is thereby used in the comparison as the SOMS signature of this incoming transmission line.

When a new changed SOMS signature is detected in an incoming SOMS message, it is accepted immediately for comparison, if the message is faultless. In this way there will be no unnecessary delays in network changes.

Initially each node employs its own internal synchronization source, and transmits its own internal SOMS signature X-O-X to the other nodes. This signature is also compared with incoming SOMS signatures. If none of the incoming signatures is smaller than the internal signature, the node continues to use its own internal timing.

In FIG. 2, the SOMS network is shown in an initial state when none of the nodes (or devices) has yet processed any one of the incoming SOMS messages. In all nodes, the highest priority is assigned to the internal SOMS signature of the node as no other signatures have yet been processed. In FIG. 2, the SOMS signatures are indicated beside each node to which they are transmitted, and the selected signature is written within the frame (in the initial situation shown in FIG. 2 all nodes employ their internal timing source). Lines used in synchronization are drawn by a continuous line and standby lines are drawn by a broken line (in the initial situation shown in FIG. 2, all lines are standby lines).

Figure 3:
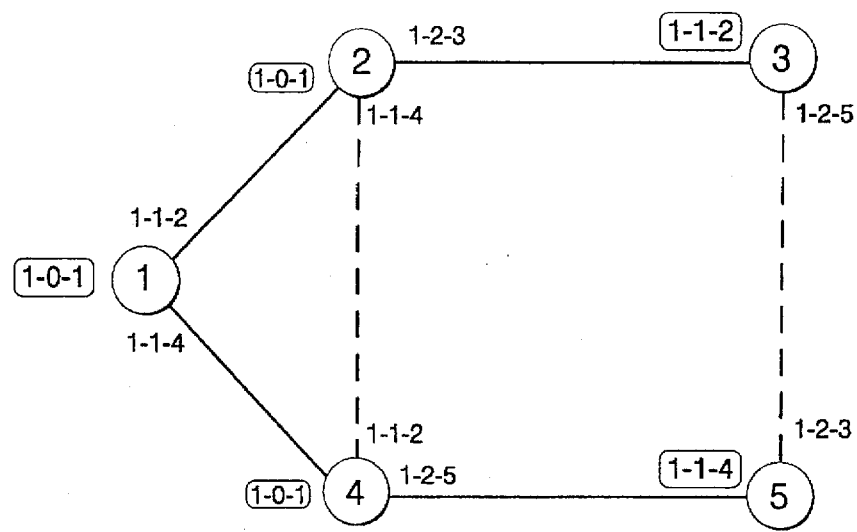
FIG. 3 illustrates the network of FIG. 2 in a stable state.

When the nodes start to process the incoming SOMS messages, node 1 retains the use of the internal timing, nodes 2 and 4 synchronize themselves with node 1 on the basis of the signature 1-0-1, node 3 is synchronized with node 2 (2-0-2), and node 5 with node 3 (3-0-3). At the same time the nodes generate their own new SOMS signatures as described above and provide their outgoing SOMS message with the new signature. The network in a stable situation is shown in FIG. 3. All nodes have synchronized with the master node 1 over the shortest possible path.

In order to enable the connection of the above-described system employing message-based synchronization to a device or network which does not understand message-based synchronization, an interface is provided between the system utilizing message-based synchronization and the network or device. The interface exhibits appropriate synchronization methods on its both sides. A signal entering the system employing message-based synchronization through the interface is assigned a standard synchronization signature in the system node where the signal is received, and so the external signal participates in the message-based synchronization with this signature. The external signal can thus be processed in the node of the system employing message-based synchronization similarly as the internal signals of the system by utilizing a synchronization signature.

Furthermore, the system employing message-based synchronization should also be capable of transmitting appropriate messages if such messages are used in the external network. The interface should also contain the basic algorithms of the synchronization method of the external network if messages or state bits are to be forwarded to the external network. As the present invention, however, relates to the connection of an external source as a timing source to a system employing message-based synchronization, and as the type of the source may vary, forwarding messages or bits in the other direction will not be described more closely herein.

In practice, there are two different alternatives for the implementation of the arrangement according to the invention: (1) the standard signature is generated at the interface of each signal entering the system, or 2) the standard signature is generated in a centralized manner in the synchronization decision process of the interconnecting node. These alternatives appear from FIGS. 4 and 5, which show means required to generate the standard signature in a node contained in a system employing message-based synchronization and connected to an external source by a transmission line. The external source may be either an external network (which does not understand message-based synchronization) or an individual external device acting as a timing source.

Figure 4:
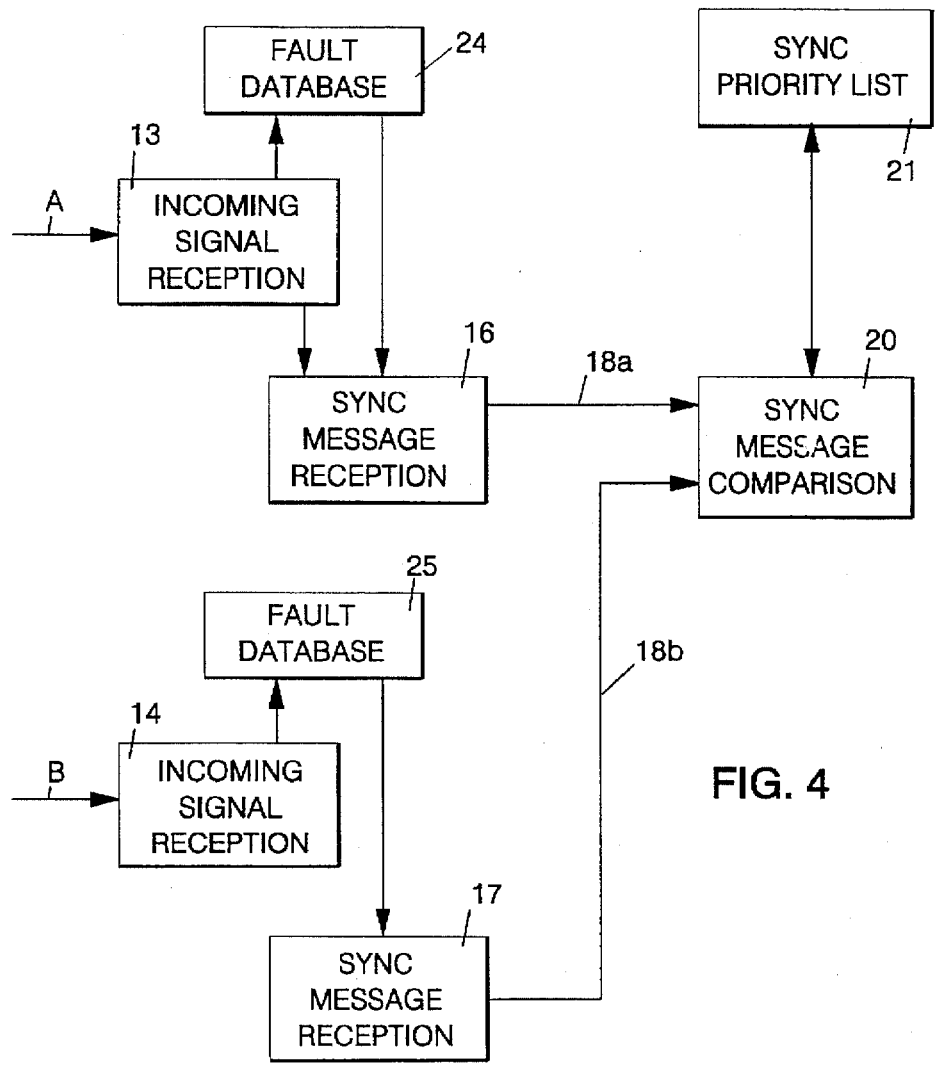
FIG. 4 illustrates the standard signature assignment according to the invention in a first embodiment of the invention.

FIG. 4 illustrates the generation of the standard signature at the interface of an incoming signal. The figure shows two signals (A and B) received at a system device from neighbouring devices. Signal A originates from the system's own node and contains a synchronization message which is extracted by a signal reception means 13 and then forwarded to an associated synchronization message reception means 16. The synchronization message reception means ascertains that the message is faultless and then forwards the message 18a further to a centralized synchronization decision means 20 having one input connected to the output of the reception means 16. The signal reception means 13 also supervises the signal quality and stores data thereon in a first fault database 24. The synchronization message reception means 16 also obtains the fault data from the database 24. If the incoming signal A is not of adequate quality for synchronization, the synchronization message reception means 16 prohibits its use. This can be done by separately prohibiting the use of the signal; alternatively, the incoming signature can be set to the largest possible value so that in practice it will not in any case be used for synchronization.

As signal B originates from an external network or an individual external device, it does not contain any synchronization message. A signal reception means 14 supervises the state of signal B and forwards information about its current state to another fault database 25. A synchronization message reception means 17 obtains information about the state of the signal from the fault database 25. The output of the synchronization message reception means 17 is connected to another input in the decision means 20. When signal B is of adequate quality, the synchronization message reception means 17 forwards a standard synchronization signature 18b, assigned in advance to signal B by the user, to the synchronization decision means 20. The more precise format of the synchronization signature depends on the applied message-based synchronization system (the format preferably corresponds to the internal synchronization signature of the synchronization system).

If signal B is not of adequate quality for synchronization, the synchronization message reception means 17 prohibits its use. Similarly as above, this may be done by separately prohibiting the use of the signal or by setting the incoming signature to the largest possible value.

The decision means 20 compares the messages and makes up a priority list for synchronization. The list is stored in a memory 21. The highest status on the priority list is assigned to an active clock source having the "best" synchronization signature complying with the applied message-based synchronization method.

Figure 5:
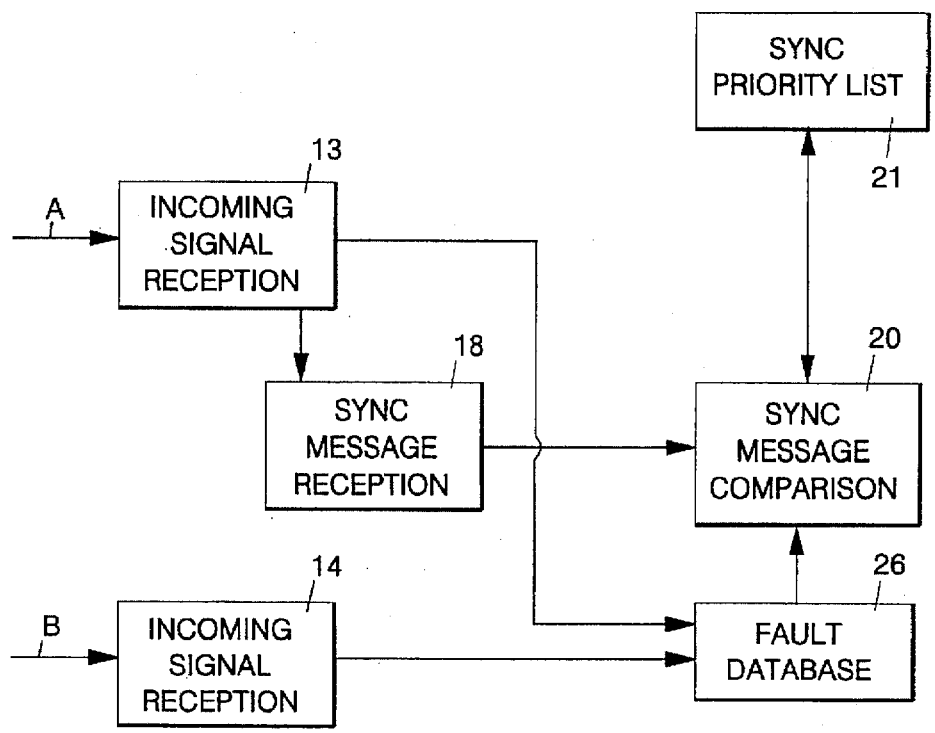
FIG. 5 illustrates standard signature assignment according to the invention in a second embodiment of the invention.

FIG. 5 shows the other alternative for the implementation of the invention, i.e. the centralized generation of the standard signatures in connection with the synchronization decision process. Even in this case, signal A originates from the system's internal device and contains a synchronization message. The signal reception means 13 forwards the synchronization message to an associated interface-specific synchronization message reception means 18 having an output connected to the decision means 20. The reception means 18 checks the message and then forwards it to the synchronization decision means 20, which makes up a priority list for synchronization and stores it in the memory 21. The reception means 13 forwards the fault data of signal A directly to the centralized fault database 16, from which the decision means 20 obtains the data and is able to invalidate the synchronization signature of signal A in a fault situation.

Signal B again originates from an external source, and does not contain any synchronization message. The signal reception means 14 forwards the status data directly into a common fault database 26, from which the node synchronization decision means 20 obtains them. When signal B is of adequate quality, the synchronization decision means 20 assigns a (standard) synchronization signature defined in advance by the user to the signal. When the signal is of inadequate quality, the synchronization decision means 20 sets the synchronization signature of signal B to the largest possible value or prohibits its use in some other way. In the former case, the standard signature has the lowest status on the priority list of the memory 21.

The invention can be applied as described above for connecting an individual external synchronization source to a system employing message-based synchronization or for interconnecting two different systems when one of the systems does not know message-based synchronization. By way of example, an application of the invention in the interconnection of a separate network N employing SOMS and a public network N1 (FIG. 6) which does not know SOMS will be described. The public network may employ e.g. conventional master-slave synchronization.

Different networks to be interconnected have a certain hierarchical order in which they are synchronized with each other. The relation of external networks to the SOMS network is determined in connection with the assignment of standard SOMS signatures to lines entering the SOMS network. If the smallest possible signature (0-0-0) is assigned as the standard signature according to the invention, then the external network is above the SOMS network in synchronization and the master node of the SOMS network will be a node connected to the external network. The master node thus transmits the signature 0-1-X as its own signature, where X is the node's own SOMS address. In other words, the assigned standard signature 0-0-0 is processed in the same way as the other incoming SOMS signatures.

If the SOMS network is to be ranked above the external network, the largest possible SOMS signature is assigned to the incoming line as the standard signature, and so it will not in any case be used as a synchronization source.

The invention also enables several connection points to the same external network to be provided in a network employing message-based synchronization (such as a SOMS network). If the external network is ranked below the SOMS network in the synchronization hierarchy, there is nothing new in the situation for the SOMS network. If one or more higher-level external networks are connected to the SOMS network at one or more points, the distribution of synchronization within the SOMS network has to be decided separately in connection with the assignment of standard signatures to the external connections and the numbering of the SOMS network. For example, synchronization may be extracted from a single point and then a synchronization tree is built up from this point downward. Alternatively, synchronization may be extracted from several connection points and a smaller synchronization tree built up separately below each point. If synchronization is extracted normally from a single point, the entire synchronization tree has to be rebuild when this primary link fails. (The term synchronization tree refers to the hierarchical tree-like structure which can be build beginning from the master node in master-slave synchronization).

Figure 6:
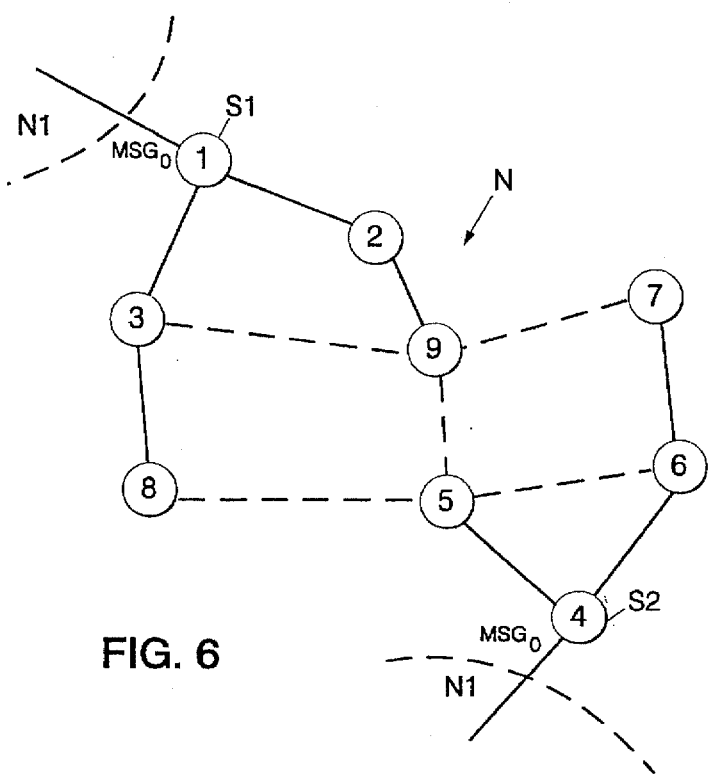
FIG. 6 illustrates a system employing message-based synchronization and connected to an external network in a case where synchronization is extracted into the system from two junction points.
Figure 7:
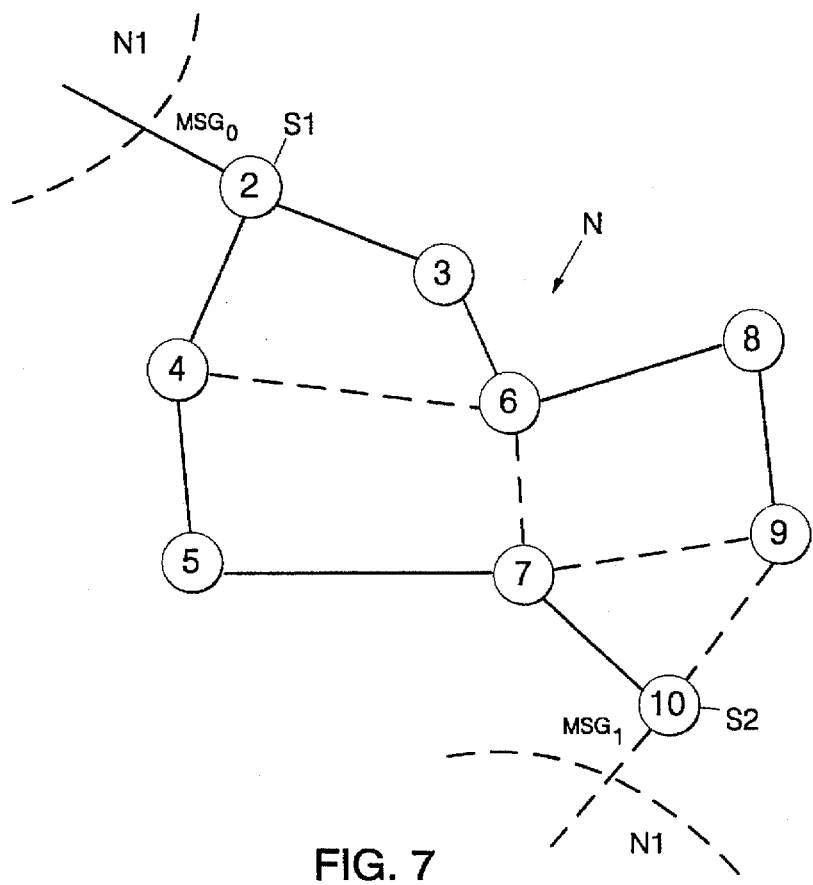
FIG. 7 illustrates a system employing message-based synchronization and connected to an external network in a case where synchronization is extracted into the system from a single junction point at a time.

In FIGS. 6 and 7, the SOMS network N, for instance, is connected at two points, i.e. nodes S1 and S2, to an external network N1. FIG. 6 shows a situation in which synchronization is extracted from both connection points, in which case the synchronization tree has been built starting from both connection nodes S1 and S2 (cf. the node numbering and the connections indicated by a continuous line). FIG. 7 illustrates the latter one of the cases described above, in which synchronization is extracted only through node S1. Synchronization through the other connection point (node S2) is used only if synchronization through node S1 is lost. In this respect it is to be noted that synchronization derived through node S2 is also assigned a signature having a higher priority than that of the highest-priority node in the SOMS network.

Figure 8:
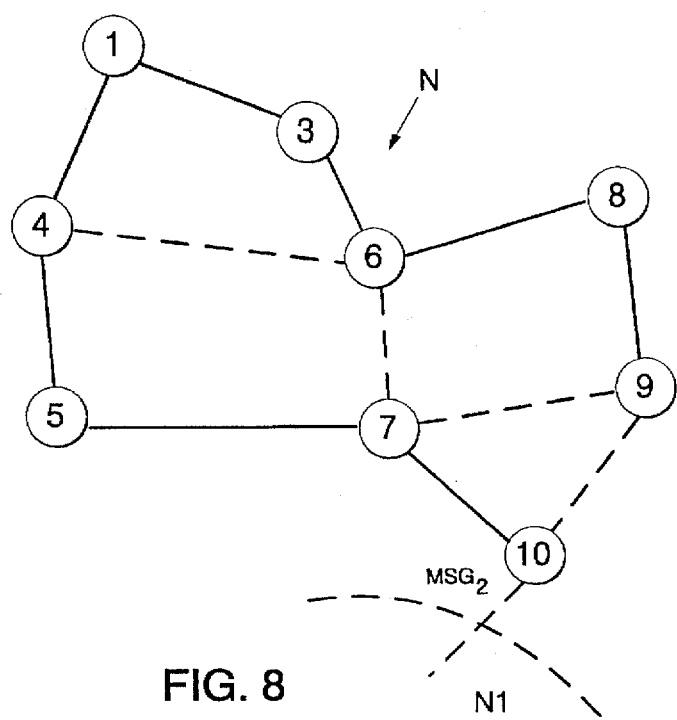
FIG. 8 illustrates the use of an external network as a standby clock in the system.

If the master node of the system has a high-quality clock, and the frequency of the clock is to be used for system synchronization, the clock frequency of the external network can be used as a standby clock according to the invention. In the example shown in FIG. 8, the master node 1 of the system has an appropriate clock for use as a system timing source. This clock, however, is the only clock of adequate quality in the system which can be used as the master clock. If the connection to the master node 1 fails, the system is synchronized with the frequency of the external network, to which the next highest value ($MSG_2$) (non-existent in the system) with respect to the highest value of the master node of the system is assigned.

Even though the invention has been described above with reference to the examples of the attached drawings, it is obvious that the invention is not restricted to them but can be modified within the inventive idea disclosed above and in the attached claims.

I claim:
1. A network arrangement, comprising:
   a communication system employing message-based synchronization and comprising a plurality of nodes interchanging signals containing information about the priority of each respective signal in the internal synchronization hierarchy of said communication system;
   at least one external network employing a synchronization method different from the message-based synchronization employed in said communication system, said at least one external network being connected to said communication system and providing at least one external synchronization source for said communication system; and
   said communication system being arranged to assign each external signal entering said communication system from said at least one external synchronization source with a selectable standard signature indicating an individually selectable priority of each said external signal with respect to internal signals in said communication system.
2. The arrangement according to claim 1, wherein:
   the format of said standard signature corresponds to a format of an internal synchronization signature of said communication system.

3. The arrangement according to claim 2, further comprising:

a signal interface for generating said standard signature separately from the internal synchronization signatures of the communication system, said signal interface being provided in a system node connected to said synchronization source and receiving at least one said external signal.

4. The arrangement according to claim 2, further comprising:

a centralized decision means in a system node to which at least one said external signal from the synchronization source is connected, for generating said standard signature in a centralized manner together with the internal synchronization signatures of said communication system.

5. The arrangement according to claim 2, wherein:

said communication system, when a said external signal from an external synchronization source is found to be faulty, is arranged to assign to that signal a standard signature corresponding to the lowest possible priority.

6. The arrangement according to claim 2, wherein:

said external synchronization source is used as a standby clock in the system by assigning a standard signature to at least one said external signal, said standard signature having the second highest level of priority after the signatures transmitted by a master node of said communication system.

7. The network arrangement, comprising:

a communication system employing message-based synchronization and comprising a plurality of nodes interchanging signals containing information about the priority of the respective signal in the internal synchronization hierarchy of said communication system;

an external synchronization source connected to more than one of said nodes in said communication system, said external synchronization source being incompatible with said message-based synchronization employed in said communication system; and each one of said more than one nodes being arranged to assign external signals entering said communication system from said external synchronization source a same standard signature indicating the highest selectable priority in the internal synchronization hierarchy in said communication system.

8. The network arrangement according to claim 7, wherein:

the format of said standard signature corresponds to a format of an internal synchronization signature of said communication system.

9. The network arrangement, comprising:

a communication system employing message-based synchronization and comprising a plurality of nodes interchanging signals containing information about the priority of the respective signal in the internal synchronization hierarchy of said communication system;

an external synchronization source connected to at least first and second one of said nodes in said communication system, said external synchronization source being incompatible with said message-based synchronization employed in said communication system; and said first one of said nodes being arranged to assign external signals entering said communication system from said external synchronization source a first selectable standard signature indicating the highest selectable priority in the internal synchronization hierarchy in said communication system; and said second one of said nodes being arranged to assign external signals entering said communication system a second selectable standard signature different from said first standard signature and indicating a selectable priority lower than said highest selectable hierarchy.

10. The network arrangement according to claim 9, wherein:

the format of said standard signature corresponds to a format of an internal synchronization signature of said communication system.

* * * * *